US005159230A

United States Patent [19]

Pais

[11] Patent Number: 5,159,230

[45] Date of Patent: Oct. 27, 1992

[54] PROJECTION CATHODE RAY TUBE WITH FLUID HEAT EXCHANGER

[75] Inventor: Martin R. Pais, Lexington, Ky.

[73] Assignee: Hughes Display Products Corp. of Ky., Lexington, Ky.

[21] Appl. No.: 666,032

[22] Filed: Mar. 7, 1991

[51] Int. Cl.[5] ........................ H01J 61/52; H04N 5/74

[52] U.S. Cl. ........................................ 313/32; 313/36; 313/35; 313/478; 358/217; 358/237

[58] Field of Search ........................ 313/35, 36, 39, 44, 313/32; 358/250, 237, 217; 315/117

[56] References Cited

U.S. PATENT DOCUMENTS

| | | | |
|---|---|---|---|
| 1,253,156 | 1/1918 | Coolidge | 313/39 |
| 2,091,978 | 9/1937 | Gross | 313/49 |
| 2,352,992 | 7/1944 | Von Henke | 313/19 |
| 2,453,003 | 11/1948 | Edwards | 358/239 |
| 2,466,329 | 4/1949 | Samson | 313/25 |
| 3,306,975 | 2/1967 | Donnay | 358/217 |
| 3,524,197 | 8/1970 | Soule | 313/423 |
| 3,536,952 | 10/1970 | Findley | 313/35 |
| 4,064,411 | 12/1977 | Iwasaki | 378/141 |
| 4,177,400 | 12/1979 | Hergenrother et al. | 313/478 |

FOREIGN PATENT DOCUMENTS

| | | |
|---|---|---|
| 902278 | 1/1954 | Fed. Rep. of Germany . |
| 006719 | 1/1979 | Japan . |
| 35454 | 3/1980 | Japan . |

*Primary Examiner*—Palmer C. DeMeo

*Assistant Examiner*—Diab Hamadi

*Attorney, Agent, or Firm*—King and Schickli

[57] ABSTRACT

A target assembly for a projection cathode ray tube is provided wherein the target member is cooled by convective fluid heat transfer occurring within and around a partially hollow support shaft screw. The target member is a solid block of relatively high, thermally conductive material, such as aluminum, coated with an electron beam sensitive material. The shaft screw also comprises relatively high thermally conductive material, such as copper, and has an internal passage leading from a source of cooling fluid, such as dry air, to a annular array of ports located in a distal portion of the supporting shaft screw. The distal portion of the shaft screw has a flaring cross section for increased heat transfer. A bellows encloses the distal portion forming a passageway so as to cause the cooling fluid to also flow along the external surface of the shaft screw. This arrangement adds to the effective convective heat transfer from the shaft screw to the cooling fluid. A rubber boot surrounds the proximate end of the shaft screw including an adjustable mounting pad to form a portion of the passageway and isolate high voltage potentials. A temperature sensitive detecting element is attached to the target member to sense changes in the temperature during operation. A controller responds to the sensed changes in the temperature and changes the flow rate of the cooling fluid to maintain the temperature relatively constant.

15 Claims, 2 Drawing Sheets

10
12
14
16
18
20
22
24
26
28
30
34
38
40
42
44
46
48
50
84
TO AIR INLET TUBE
DRY AIR SOURCE
90
MASTER CONTROLLER
88
TEMPERATURE SENSOR
86

PROJECTION CATHODE RAY TUBE WITH FLUID HEAT EXCHANGER

BACKGROUND OF THE INVENTION

The present invention relates to projection cathode ray tubes, and more particularly, to a fluid cooled arrangement for mounting the target member of the tube to promote efficient heat transfer from the target member, and thereby enhance the performance and extend the life cycle of the tube.

The use of projection cathode ray tubes to project electronically generated images onto remotely located viewing screens is well known. An example of the construction of a projection tube may be seen in U.S. Pat. No. 4,177,400 to Herhenrother et al., issued Dec. 4, 1979. As described in the U.S. Pat. No. 4,177,400, a beam of electrons emitted by an electron gun is directed toward a curved target member coated with an image producing material, which typically comprises one or more fluorescing phosphors. The resulting image is reflected by a facing mirror out through a correction lens onto the remote screen for viewing. The supporting structure for the target member permits the axial position and tilt of the target member to be adjusted to focus the image of the tube.

A substantial effort has been expended to provide improved tubes for projecting clear, bright and well focussed images needed for many applications, such as in flight simulators, where the objective is to create as close as possible a live training environment. To provide such images it is frequently necessary to operate the tube with sustained electron beams of high intensity impacting against the image forming phosphor coating. Energy from the beam is absorbed by the phosphor coating with only a fraction being released in the form of visible light. The balance of the energy becomes heat which is absorbed by the underlying support target structure. If the heat cannot be transferred away rapidly enough, the temperature of the target member and coating rises. The effective operating life of the phosphor coating may be reduced under continued, excessively high temperature conditions. This places obvious constraints on the sustained, efficient operation of the tube.

To compensate for the dull images as the phosphor coating degrades, some users resort to increasing the intensity of the electron beam, which does temporarily increase the brightness of the resulting image. However, the increased intensity simply compounds the heat problem. Some phosphors, such as blue phosphors, are particularly susceptible to high temperature levels and experience a relatively rapid reduction in their ability to provide images of the desired brightness. Finally, the increased temperature levels may cause the various components of the tube to expand excessively, which in turn, requires undesirable refocussing of the image.

Various structures have been used by those skilled in the prior art to control or reduce the high temperature levels and concomitant deleterious effects experienced in the operation of projection cathode ray tubes. The inventor of the U.S. Pat. No. 4,177,400 suggests that the various metallic components of the structure supporting the target member can provide a path for the conduction of heat away from the target member. Under conditions in the tube requiring the use of a relatively high level intensity electron beam, the transfer of heat by conductivity through the components away from the target member often cannot be accomplished rapidly enough. Thus, the components themselves, especially where bright images over a sustained period are required, reach temperature levels too high for operation without the deleterious effect on the phosphor coating, eventually resulting in having to prematurely replace the tube.

U.S. Pat. No. 3,524,197 to Soule issued Aug. 11, 1970 illustrates the use of a target that comprises the rear surface of the tube and is made from a copper substrate containing a plurality of cooling channels. Water flows through the channels to remove the heat. While the use of a cooling technique, such as described in the U.S. Pat. No. 3,524,197 does transfer heat from the target member, other undesired effects may be introduced. By reducing the mass of the underlying substrate by channels or otherwise providing a hollow construction, the ability of the substrate to uniformly dissipate the heat by conduction from the coating is adversely affected. Such hollow target members introduce undesired temperature gradients within the body of the target. Also the construction of such target members is made much more complicated and expensive.

Still another hollow target coolant system set forth in Japanese Patent Application 55-108,796 published Mar. 3, 1980 describes the use of a heat pipe system based on the premise of liquid that evaporates absorbing (through the heat of vaporization) the excess heat from a hollow target substrate coated with fluorescent material. The problem of removing the heat once it is transferred to the end of the pipe is not fully explained. Such hollow structure in the target member is likely to pose problems identical to those described above.

These and other prior art techniques for cooling and controlling the temperature levels of the target member have not proved to be entirely satisfactory due to the inability to transfer heat rapidly enough away from the target member or requiring expensive and complicated structures to accomplish the transfer. It would be desirable, therefore, to provide a projection cathode ray tube with an improved target assembly that provides increased ability to reduce and efficiently control the operating temperature of the target member, even at relatively high intensity electron beam levels. Additionally, it would be desirable that such an improved target assembly be able to be easily and economically manufactured.

SUMMARY OF THE INVENTION

Thus, it is a primary object of the present invention to provide a projection cathode ray tube with an improved target assembly, wherein the target member is effectively and efficiently cooled during operation.

It is another object of the present invention to provide such a projection tube wherein longer sustained electron beam intensity is permitted due to increased ability of the target assembly to transfer heat away from the target member.

It is still another object of the present invention to provide a projection tube and/or an improved target assembly for the cooling of the target member wherein the components of the assembly are similar to those presently employed, thus avoiding the need for a complete redesign of the tube and retraining of the manufacturing and service personnel.

It is yet another object of the present invention to provide an improved target assembly wherein the support shaft screw is uniquely utilized as a heat transfer mechanism from the target member to a cooling fluid.

It is a related object and in accordance with the other aspects of the present invention to provide for the effective and continuous control of the temperature level of the target member in response to changes in the electron beam intensity and/or the changes in the heat generated by the image producing materials of the target member coating.

Additional objects, advantages and other novel features of the invention in part will be set forth in the description that follows and in part will become apparent to those skilled in the art upon examination of the following or will be learned with the practice of the invention. Other objects and advantages of the invention may be realized and obtained by means of the instrumentalities and combinations particularly pointed out in the appended claims.

To achieve the foregoing and other objects, and in accordance with the purposes of the present invention as described herein, a projection tube including an improved fluid cooled target assembly is provided. The target member of the assembly is supported by a unitary support shaft screw and mount, including an adjustable mounting pad. The support shaft screw is made from a highly thermal conductive material and provided with an axial passage connected to an external source of cooling fluid. The passage extends along substantially the full length of the support shaft screw and communicates with an annular array of ports opening into a confined space adjacent the exterior surface of the shaft screw.

A cooling fluid flows along the passage, out the ports and into the confined space. Heat is transferred primarily by convection from the support shaft screw to cool the target member. The heat is transferred at all points along the interior and exterior surfaces of the shaft screw in contact with the fluid. The fluid is then removed entirely from the cathode ray tube completing the heat transfer. Because the heat transfer to the cooling fluid occurs at a location removed from the target member, the need for using channels or the like within the target member, which are difficult to form and also establish undesirable heat gradients, is avoided.

In accordance with another aspect of the present invention, the temperature level of the target member may be continuously monitored and relayed to a controller for adjustment of the flow rate of the fluid passing through and about the support shaft screw. The adjustment in the flow rate of the fluid may be in a proportional response to a sensed change in the temperature of the target member. The adjustment in the flow rate affects the heat transfer rate, thus providing the desired control of the temperature of the target member.

Numerous other objects of the present invention will be apparent to those skilled in this art from the following description wherein there is shown and described a preferred embodiment of the present invention, simply by way of illustration of one of the modes best suited to carry out the invention. As will be realized, the invention is capable of other different embodiments and its several details are capable of modification in various, obvious aspects without departing from the invention. Accordingly, the drawing and descriptions will be regarded as illustrative in nature and not restrictive.

BRIEF DESCRIPTION OF THE DRAWING

The accompanying drawing in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

Figure 1:
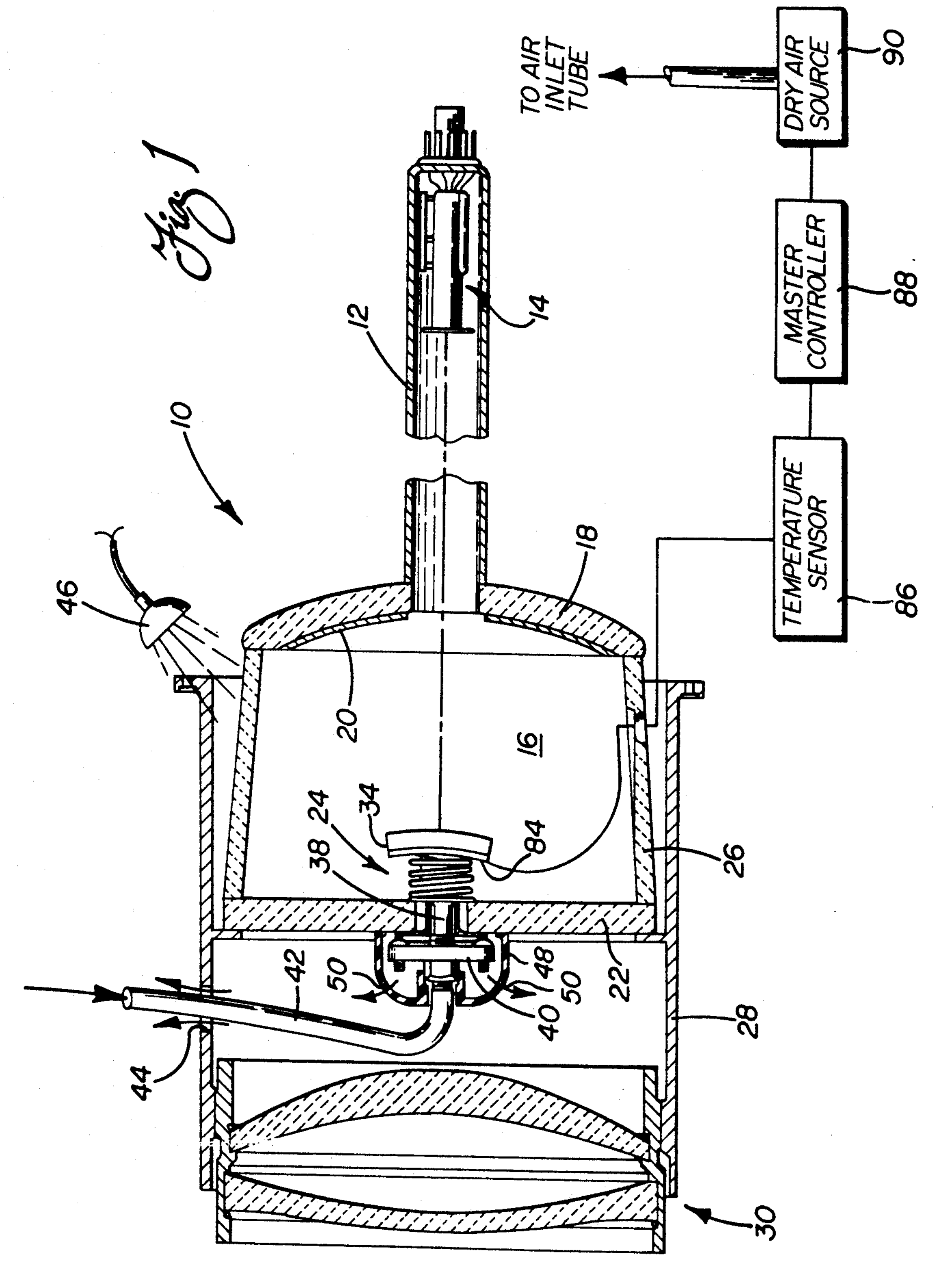
FIG. 1 is a longitudinal cross sectional view through a projection cathode ray tube in which the fluid cooled target assembly of the present invention is utilized.

An overall, cross sectional view of a cathode ray tube 10 is generally illustrated in FIG. 1. As depicted therein, an elongated neck 12 houses the various components of an electron gun, shown generally as numeral 14, and opens into an image processing cavity 16. Mounted on the inside surface of an entry wall 18 circumscribing the opening of the neck 12 into cavity 16 is an annular concave Schmidt mirror 20. An optically transparent face plate 22 defines the opposite wall of the cavity 16 and serves to mount a target assembly 24, which incorporates the improvement principles of the present invention. The cavity 16 is additionally defined by a frustro-conical wall 26 diverging from the mirror 20 to the face plate 22 completing the sealed tube envelope.

Figure 1A:
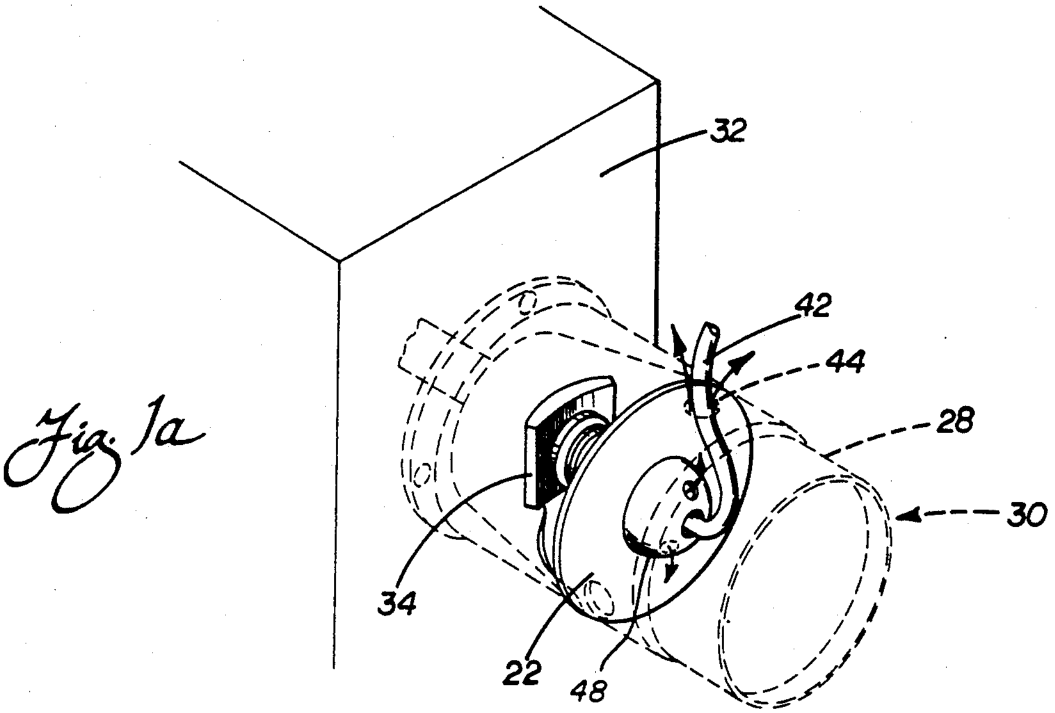
FIG. 1A is a perspective view of the fluid cooled target assembly of the present invention showing in simplified form a portion of the tube and housing in dashed lines and also illustrating the cooling fluid entry hose, and insulating boot enclosing one end of the target assembly.

A tubular housing 28 provides support to and encloses the envelope by connection at the face plate 22. Positioned at the opposite end of the housing 28 is a correction lens assembly 30. As best seen in FIG. 1A, the housing 28 may be bolted or otherwise releasably secured to the projector body 32 for easy access in the unlikely event that repairs, or replacement of component parts, are required.

Figure 2:
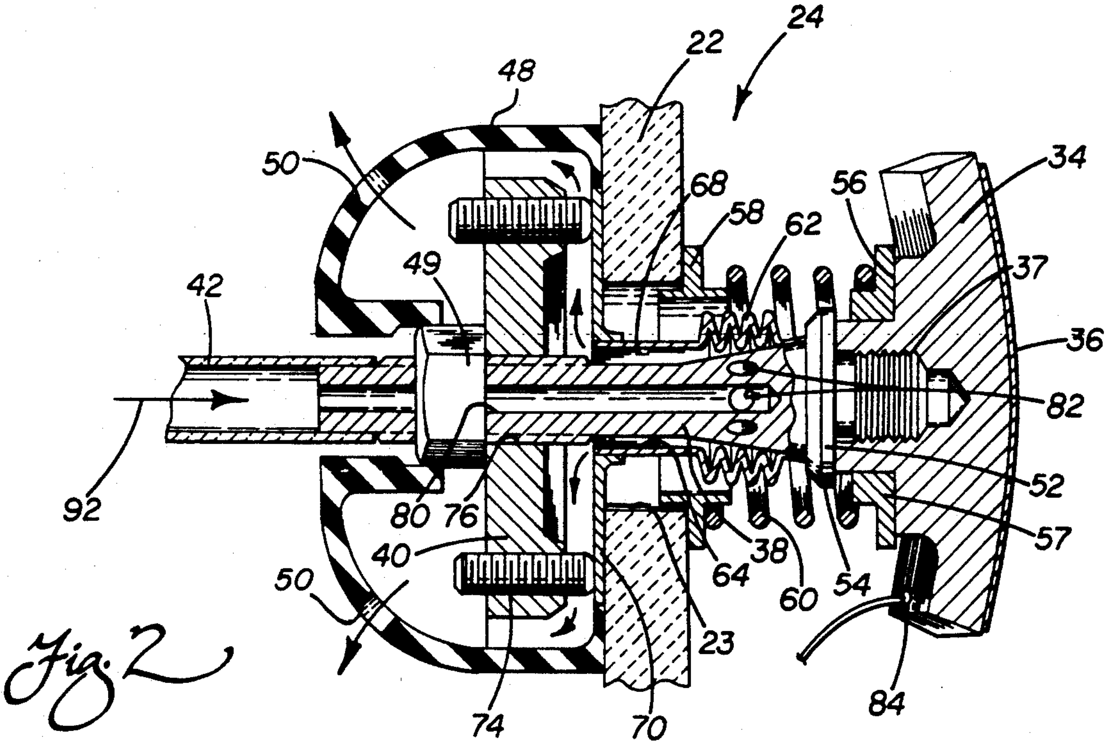
FIG. 2 is an enlarged cross sectional view through the target assembly and the support shaft screw depicting the internal fluid passage and ports and passageway around the external surface.

In FIG. 1, and more in detail in FIG. 2, the target assembly 24 is shown to be generally comprised of an appropriately curved target member 34 attached to one end of a support shaft screw 38 extending through a central aperture 23 in the face place 22. Support shaft screw 38 is secured (in a manner to be described) to an adjustable mounting pad 40. The proximate end of the support shaft screw 38 is connected to a supply hose 42 entering through an opening 44 in the housing 28 (see FIG. 1A).

The target member 34 is provided with a face coating 36 highly sensitive to a stream of electrons emitted by the electron gun 14 along the inside of the tube 10. Such coating may comprise a plurality of phosphors capable of forming a residual image following electron bombardment. The resulting image is reflected by the mirror 20, through the transparent face plate 22 and out through the correction lens assembly 30 (see FIG. 1) for viewing on a remotely located screen (not shown). An external light source 46 may be provided to illuminate target member 34 and to enhance the image or otherwise improve the performance of the cathode ray tube.

Due to the high voltage potential that is generated by the target member 34 during operation of the cathode ray tube 10, it may be desirable to isolate the proximate end of the shaft screw 38 and the adjustable mounting pad 40 with an insulating boot 48, which can be made from any inert, dielectric material, such as rubber. As illustrated in FIG. 1, the boot 48 is sealed against face place 22 and about the end of locking nut 49 on the shaft screw 38. A plurality of openings 50 provide for exhaust flow of cooling fluid, as to be described below.

In the cross sectional view of FIG. 2, the support shaft screw 38, its related structure, and its relationship with the target member 34 is highlighted. The target member 34, may be made from a highly thermally conductive material, such as aluminum. The target member 34 is provided with an internally threaded bore 37 adapted to receive and be supported by the externally threaded end of the support shaft screw 38. A pair of stepped shoulders 54 and 56 on the target member 34 serve to position and abut flange 52 of the support shaft screw 38 and annular flanged ring 57, respectively.

A seating ring 58 is positioned about the aperture 23 in the face plate 22. Compressed between the rings 57 and 58 is a helical compression spring 60 serving to tension and thus assist in positioning support screw 38 centered in the aperture 23. Also, as a result, the opposing force of the mounting pad 40 positions the target member 24 at the desired focal distance from the face plate 22 within the tube 10.

Within the spring 60 is a tubular bellows 62 forming a confined passageway 64 about the support shaft screw 38. A first end of the bellows 62 extends along the surface of the distal end of the support screw 38 and is sealed against the flange 52, thus closing the passageway. An extension 68 passes through the aperture 23 and is welded or otherwise sealed to the inner perimeter of an annular bearing plate 70 positioned about the mouth of aperture 23, thus providing an open end to the confined passageway 64. Preferably, the bellows 62 is fabricated from a material which can be welded or otherwise sealed in a fluid tight manner to the metallic components of the target assembly 24 and favorably respond to flexing as necessary when the target assembly 24 is adjusted.

The adjustment mounting pad 40 may take the form of a tripod with the three arms (only two being shown), each adapted to receive individually adjustable threaded set screws 74 bearing against the bearing plate 70. Mounting pad 40 is provided with a bore 76 with internal threads which are adapted to engage the mating external threads formed on the support shaft screw 38. The same external threads are also engaged by the locking nut 49 which bears against the facing surface of the mounting pad 40.

Referring again specifically to FIG. 2, it may be seen that the support shaft screw 38 is provided with an internal passage 80 extending from the proximate end connected to the hose 42 to a position near the flange 52. An annular array of spaced ports 82 in the support shaft screw 38 place the interior passage 80 in fluid communication with the exterior passageway 64. Such passage 80 and connecting ports 82 are easily machined in the support shaft screw 38 by a simple lathe machining process, thereby avoiding the expensive and complicated manufacturing processes required to provide channels in the target members of the prior art. The cross sectional area of the support shaft screw 38 flares, i.e. becomes increasingly large toward the flange 52 in the distal portion adjacent the ports 82, thus adding to the mass of thermally conductive material placed against the target member 34. Additionally, the surface area of the shaft screw 38 in this region is increased which promotes more efficient heat transfer. Thus, the flaring cross section of the distal portion provides rapid transfer by conduction of the heat produced by the coating 36 on the target member 34 during operation of the tube, as well as rapid dispersal by convection to the fluid in the passageway 64.

Preferably, the support shaft screw 38 is machined from bar stock of a highly thermally conductive metal, such as copper. As may now be appreciated, by allowing the cooling fluid to flow through a passage within the support shaft screw, out the ports 82 and back along the exterior surface thereof, provides an exceptionally efficient fluid heat transfer mechanism. Additionally, the absence of channels and the like within the target member near the coating prevents the rise of temperature gradients (hot spots), thus promoting uniform heat transfer from the coating.

In FIGS. 1 and 2, it can be seen that a thermocouple 84 may be secured to the back of the target member 34, thus providing a signal proportional to the instantaneous temperature of the target member 34 through a temperature sensor 86 and fed into a microprocessor master controller 88. A supply of cooling fluid, such as a dry air source 90, may be controlled by the controller 88 to supply the cooling air to the support shaft screw 38 at flow rates demanded by the operating conditions.

In operation, cathode ray tube 10 is energized and a stream of scanning electrons impinge against coating 36. Images are formed by the phosphors in the coating 36 and are reflected by Schmidt mirror 20 out through the correcting lens assembly 30 to be viewed on a remotely located screen. The heat generated by the electron stream is uniformly dissipated by the relatively large thermally conductive mass of the target member 34. Heat is transferred along the entire length of the supporting shaft screw 38. Cooling fluid supplied by the source 90 flows through the hose 42 into the axial passage 80, in a direction as generally indicated by the flow arrow 92.

The supporting shaft screw 38, acting as a heat exchanger, transfers the heat conducted from the target member 34 to the cooling fluid flowing through the passage 80. The efficiency of the heat transfer is increased by the flared cross section of the distal portion adjacent the ports 82. The convection process allows the heat to be absorbed along the inside surface of the shaft screw passage 80, as well as through the ports 82 and then back along the exterior surface in the passageway 64 defined by the bellows 62. The cooling fluid exiting the array of ports 82 hits the inside folds of the bellows providing turbulence in the fluid creating a scrubbing effect as it flows back along the exterior surface for even greater cooling action. The cooling fluid then exits into the cavity defined by boot 48, flows around the mounting pad 40 and out into the atmosphere through the openings 50.

Any cooling fluid may be employed which is able to withstand the high voltage potential on the target member 34 and shaft screw 38. A preferred cooling fluid is dry air. If the dry air should generate ozone during the operation of the cathode ray tube 10, such dry air may be suitably scrubbed, for example, by passing the exiting air through a bed of activated charcoal.

Should the temperature of the target member 34 rise beyond a desired level due, for example, to a sustained increase in the intensity of the electron beam, the controller 88 in proportional response to a signal received from thermocouple 84 and the temperature sensor 86 causes the source 90 of cooling fluid to increase the flow rate of the cooling fluid. This in turn increases the rate at which heat is transferred to the passing fluid, thereby maintaining the temperature of the target assembly at levels suitable for sustained operation and long term tube life.

From the foregoing it may now be understood that the present invention provides for the effective and efficient cooling of the target member 34 of a projection cathode ray tube 10 in a simple and economic manner. The fluid cooled support shaft screw 38 acts as a fluid media heat exchanger which permits the temperature to be maintained at the desired reduced operating levels, thus extending the life of the image producing phosphors. Additionally, the brightness of the tube 10 may be increased because the otherwise concurrent increase in heat of the target member 34 can be minimized. Finally, through better control of the temperature, the amount of thermal expansion during tube operation is minimized, thereby more effectively controlling the focus and clarity of the image reproduced at the remote viewing screen. Cooling in this manner through the shaft screw 38 also obviates the need for channels and the like within the target member. Thus temperature gradients across the coating 36 are avoided and uniform transfer of heat from the coating and efficient dispersal is maintained.

The foregoing description of a preferred embodiment of the invention is solely for the purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A projection cathode ray tube including an improved target assembly comprising:

a target member of thermally conductive material having a surface coated with an electron beam sensitive material for forming an image when excited by an electron beam;

a shaft supporting said target member at the distal end, said shaft comprising thermally conductive material and being in thermal communication with said target member;

means for mounting said support shaft within said tube;

said shaft defining an internal passage in fluid communication with at least one port located along a portion of said shaft near said distal end;

enclosing means for defining a fluid passageway external to and along said shaft in fluid communication with said port, said fluid passageway extending to an opening leading to ambient space; and means for supplying a flow of cooling fluid to said passage in said support shaft;

whereby cooling fluid is circulated along said internal passage through said port into said external passageway to pick up heat by convection and exhausted therefrom into the ambient space.

2. The projection cathode ray tube with the improved target assembly of claim 1 in which said target member comprises a solid mass of thermal metal having relatively high thermal conduction coefficient providing substantially even distribution and efficient transmission of heat to the distal end of said shaft.

3. The projection cathode ray tube with the improved target assembly of claim 2 in which said support shaft is a single element screw and means for adjusting said screw to focus the image produced.

4. The projection cathode ray tube with the improved target assembly of claim 3 in which said support shaft screw has a flaring cross section along said distal portion in the direction toward and abutting said target member thereby increasing the mass of thermally conductive metal for transmission of heat from said target member and said coated surface.

5. The projection cathode ray tube with the improved target assembly of claim 4 in which said enclosing means includes a bellows circumscribing said distal portion of said shaft screw and sealed at said distal end around said shaft screw and enclosing said port.

6. The projection cathode ray tube with the improved target assembly of claim 1 including means for detecting changes in the temperature of said target member; and means responsive to said detecting means for causing said supplying means to change the flow of said cooling fluid in proportion to the change in said temperature thereby maintaining the temperature of said target member at a predetermined level.

7. The projection cathode ray tube with the improved target assembly of claim 6 in which said supplying means supplies dry air to said shaft.

8. The projection cathode ray tube with the improved target assembly of claim 1 including dielectric means substantially enclosing the proximal end of said shaft for isolating high voltage potentials developed on said shaft during operation of said tube.

9. The projection cathode ray tube with the improved target assembly of claim 8 wherein said dielectric means includes a rubber boot surrounding said mounting means; said boot forming a cavity to receive fluid from said passageway and including an opening for release of said cooling fluid to ambient space.

10. The projection cathode ray tube with the improved target assembly of claim 9 wherein said mounting means includes means for adjusting the focus of said target assembly.

11. The projection cathode ray tube with the improved target assembly of claim 1 wherein said target member is formed of aluminum and said shaft formed of copper.

12. The projection cathode ray tube with the improved target assembly of claim 1 wherein said shaft includes an annular array of ports positioned around said distal portion of said shaft to provide convective heat transfer around substantially the full circumference of said shaft along said passageway.

13. A target assembly for a projection cathode ray tube comprising:

a target member having a surface coated with an electron beam sensitive material for forming an image when excited by an electron beam;

a support shaft screw having the distal end threadedly engaging said target member, said shaft comprising thermally conductive material and being in thermal communication with said target member, said shaft screw provided with a passage extending from the proximal end to a distal portion of said screw adjacent said distal end and said target member, said shaft screw further provided with an annular array of ports in said distal portion communicating with said passage;

a substantially cylindrical member circumscribing a portion of said shaft screw defining an enclosed space about said distal portion sealed at one end adjacent said target member and open at the other end; and means for supplying cooling fluid to said shaft screw at said proximal end and causing said cooling fluid to circulate through said passage, out said ports, into said enclosed space and out said open end;

thereby effecting convective transfer of heat from said shaft screw to said cooling fluid at all points internally along said passage and externally along said distal portion.

14. The target assembly of claim 13 wherein said support shaft screw has a flaring cross section along said distal portion in a direction toward said target member and abutting said target member thereby providing an increased mass of thermally conductive material adjacent to said target member for increased transfer of heat generated during operation of said tube.

15. The target assembly of claim 14 including means for detecting changes in the temperature of said target member, and means responsive to said detecting means for causing said supply means to change the flow of said cooling fluid in proportion to the change in said temperature thereby maintaining the temperature of said target member at a predetermined level.

* * * * *